US007477981B2

(12) United States Patent
Agrell (10) Patent No.: US 7,477,981 B2
(45) Date of Patent: Jan. 13, 2009

(54) ARRANGEMENT AND METHOD FOR CONTROLLING A COMBUSTION ENGINE (75) Inventor: Fredrik Agrell, Älvsjö (SE)

(73) Assignee: Scania CV AB (publ) (SE)

( * ) Notice: Subject to any disclaimer, the term of this patent is extended or adjusted under 35 U.S.C. 154(b) by 0 days.

(21) Appl. No.: 11/576,661

(22) PCT Filed: Oct. 13, 2005

(86) PCT No.: PCT/SE2005/001519

§ 371 (c)(1),
(2), (4) Date: Apr. 4, 2007

(87) PCT Pub. No.: WO2006/043875

PCT Pub. Date: Apr. 27, 2006

(65) Prior Publication Data

US 2008/0046160 A1 Feb. 21, 2008

(30) Foreign Application Priority Data

Oct. 20, 2004 (SE) .................................... 0402534

(51) Int. Cl.
F02D 28/00 (2006.01)
(52) U.S. Cl. ...................... 701/103; 701/110; 123/90.15
(58) Field of Classification Search ................. 701/103, 701/110, 115, 102; 123/90.11, 90.12, 90.15, 123/90.17
See application file for complete search history.

(56) References Cited

U.S. PATENT DOCUMENTS 4,760,830 A    8/1988  Bullis et al.
4,785,771 A *  11/1988 Ibuki et al. ............. 123/179.17
5,050,543 A *   9/1991 Kawamura ................ 123/90.11
5,124,598 A *   6/1992 Kawamura ................ 123/90.11
5,619,965 A *   4/1997 Cosma et al. ............ 123/90.12
6,615,129 B2 *  9/2003 Kabasin ...................... 701/110
7,069,909 B2 *  7/2006 Pozar et al. ............... 123/90.15

FOREIGN PATENT DOCUMENTS

WO        WO 98/07973 A1    2/1998

OTHER PUBLICATIONS

International Search Report PCT/SE2005/001519 dated Jan. 11, 2006.

* cited by examiner

Primary Examiner—Hieu T Vo
(74) Attorney, Agent, or Firm—Ostrolenk, Faber, Gerb & Soffen, LLP (57) ABSTRACT An arrangement, a computer-readable medium and a method for controlling an HCCI (homogenous charge compression ignition) engine are disclosed. The arrangement comprises a control unit for initiating closure and/or opening of the inlet valve and/or the exhaust valve at a current crankshaft angle in such a way that self-ignition of the fuel mixture occurs when the crankshaft is at a target crankshaft angle. The arrangement comprises cards for storing relevant values of the current crankshaft angle as a function of at least one operation-related parameter such as engine speed, temperature and pressure, and an estimator estimating values of the operation-related parameter during operation of the combustion engine. The control unit can adjust the inlet valve and/or the exhaust valve depending on the stored value of the current crankshaft angle.

19 Claims, 5 Drawing Sheets

ARRANGEMENT AND METHOD FOR CONTROLLING A COMBUSTION ENGINE

CROSS REFERENCE TO RELATED APPLICATION

The present application is a 35 U.S.C. §§ 371 national phase conversion of PCT/SE2005/0015 19, filed Oct. 13, 2005, which claims priority of Swedish Application No. 0402534-2, filed Oct. 20, 2004. The PCT International Application was published in the English language.

The present invention relates to an arrangement and a method for controlling a combustion engine by controlling operation of an inlet valve or an outlet valve of the combustion chamber for controlling ignition.

One type of such combustion engines is called HCCI (homogeneous charge compression ignition) engines, which may be regarded as a combination of an Otto engine and a diesel engine. In HCCI engines, a homogeneous mixture of fuel and air is compressed in a combustion chamber until self-ignition of the fuel mixture occurs. Advantages of HCCI engines are that they produce low discharges of nitrogen oxides $NO_x$ and soot particles while at the same time having a high degree of efficiency. One reason why HCCI engines are not used conventionally to any great extent is that it is difficult to control the self-ignition of the fuel mixture to a correct crankshaft angle.

Two different valve control strategies are known for controlling the self-ignition of the fuel mixture in laboratory conditions. The first strategy entails closing the exhaust valve before the combustion chamber has been emptied of exhaust gases from a preceding combustion process and opening the inlet valve later than usual. Such a so-called negative overlap results in a variable amount of exhaust gases being retained in the combustion chamber for a subsequent combustion process. The hot exhaust gases retained in the combustion chamber raise the temperature of the fuel mixture for the next combustion process. A suitable amount of retained exhaust gases can thus impart to the fuel mixture an initial temperature such that it self-ignites at a substantially optimum crankshaft angle.

The second strategy involves controlling the closure of the inlet valve. The compression ratio in the cylinder can be varied by varying the crankshaft angle at which the inlet valve closes. The later the inlet valve closes, the shorter the piston movement required for compressing the fuel mixture. Self-ignition of the fuel mixture can be caused to occur at a substantially optimum crankshaft angle by varying the inlet valve closure and hence the effective compression ratio in the cylinder.

A difficulty of such valve control strategies is that they entail the valve having to be controlled quickly and with good precision between substantially each cycle of combustion processes so that the self-ignition in the HCCI engine occurs at a substantially optimum crankshaft angle even when rapid shifts between different operating points are required.

SUMMARY OF THE INVENTION

The object of the present invention is to provide an arrangement and a method for achieving functional control of the self-ignition of a combustion engine even when rapid shifts between different operating points are required.

This object is achieved with the arrangement which comprises an arrangement for controlling a combustion engine, wherein the combustion engine comprises a combustion chamber, a movable piston adapted to compressing a fuel mixture in the combustion chamber so as to cause self-ignition of the fuel mixture, a crankshaft driven by movements of the piston. at least one inlet valve of the combustion chamber and at least one exhaust valve of the combustion chamber, wherein the arrangement comprises a control unit operable for initiating at least one of closure and opening of at least one inlet valve and at least one exhaust valve at a crankshaft angle (ivc, ivo, evc) such that self-ignition of the fuel mixture occurs when the crankshaft is at substantially a desired crankshaft angle ($SOC_{bör}$), the arrangement comprises a storage device adapted to storing relevant values of the crankshaft angle (ivc, ivo, evc) as a function of at least one operation-related parameter (n, τ) and a parameter-estimator operable for estimating values of the operation-related parameter (n, τ) during operation of the combustion engine. whereby the control unit is adapted to initiating the at least one of closure and opening of the inlet valve and the exhaust valve with the stored value of the crankshaft angle (ivc, ivo, evc) which corresponds to the estimated current value of the operation-related parameter (n, τ). With advantage, storage means, i.e., a storage device are used in the form of, for example, cards which comprise relationships between one or more operation-related parameters and relevant values of crankshaft angles at which the inlet valve and/or the exhaust valve have to be opened or closed if self-ignition is to take place at a desired crankshaft angle. Such stored cards and information about current values of operation-related parameters can be used to provide information about a relevant value of crankshaft angle at which the valve adjustment needs to be effected close to each combustion process. It is thus possible to provide rapidly adjustable control of a combustion engine even when rapid shifts between different operating points are required.

According to a preferred embodiment of the present invention, said storage means are adapted to storing values of said crankshaft angle and the operation-related parameter when the crankshaft is at a predetermined rotational position. Said predetermined rotational position needs to be close to the crankshaft angle at which self-ignition occurs but at a well-selected distance before self-ignition commences. With advantage, said predetermined rotational position of the crankshaft is within the range 8° to 12° before it reaches a rotational position which corresponds to the piston's top dead centre position at which the self-ignition of the fuel mixture substantially occurs. Within this range it is possible to provide a predetermined crankshaft angle which is close to the self-ignition but at a clear distance from the start of the self-ignition process.

According to another preferred embodiment of the present invention, a parameter-estimating means comprises a sensor adapted to detecting the combustion engine's speed as an operation-related parameter. Engine speed is a relevant parameter very suitable for use in this context. This parameter is also easy to estimate since the combustion engine usually already comprises existing equipment for determining the engine speed. Said parameter-estimating means preferably comprises at least one unit adapted to calculating or estimating the ignition delay, which is the time to self-ignition from when the crankshaft is at said predetermined rotational angle, as an operation-related parameter. Estimating or calculating this operation-related parameter involves, however, information on a plurality of other operation-related parameters such as pressure and temperature in the combustion chamber when the crankshaft is at the predetermined rotational position. To this end, the arrangement may comprise sensors adapted to detecting the current pressure, and a calculation unit adapted to calculating the current temperature, in the combustion chamber when the crankshaft is at said predetermined rotational position.

According to a preferred embodiment of the present invention, the arrangement comprises detection means adapted to detecting when the actual self-ignition of the fuel mixture commences. The start of the combustion process may for example be detected by means of the aforesaid pressure sensor which substantially continuously detects the pressure in the combustion chamber. In this case the start of the combustion process can be detected substantially directly when a pressure rise due to the combustion process is detected. Alternatively, a crankshaft angle may be detected at which, for example, half of the fuel has been consumed. Thereafter the start of the combustion process can be calculated on the basis of information about parameters such as, inter alia, lambda λ. The arrangement may comprise feedback means adapted to comparing the actual crankshaft angle for self-ignition with the desired value for self-ignition, in which case the control unit is adapted to controlling the self-ignition of the next combustion process on the basis of this comparison. Knowledge of this difference makes it possible to effect an adjustment of the next combustion process so that the influence of control errors and the like is reduced.

According to another preferred embodiment of the present invention, the control unit is adapted to initiating, in a first load range, closure of the exhaust valve at a crankshaft angle and opening of the inlet valve at a crankshaft angle in such a way that it is possible to supply or retain a variable amount of hot exhaust gases in the combustion chamber so that the self-ignition of the next combustion process substantially occurs at the optimum crankshaft angle. This strategy is used for leaner than ideal fuel mixtures.

With advantage, the control unit is adapted to initiating, in a second load range, closure of the inlet valve at a crankshaft angle in such a way that it is possible to vary the effective compression ratio in the combustion chamber. This strategy is used for richer than ideal fuel mixtures. Using these two strategies which are thus mutually adjacent makes it possible to provide control of a combustion engine over a continuous relatively large load range.

The object of the invention is also achieved with a method comprising a control unit operable for initiating at least one of closure and opening of at least one inlet valve and at least one exhaust valve at a crankshaft angle (ivc, ivo, evc) such that self-ignition of the fuel mixture occurs when the crankshaft is at substantially a desired crankshaft angle ($SOC_{bor}$). The arrangement comprises a storage device adapted to storing relevant values of the crankshaft angle (ivc, ivo, evc) as a function of at least one operation-related parameter (n, τ) and a parameter-estimator operable for estimating values of the operation-related parameter (n, τ) during operation of the combustion engine. The control unit is adapted to initiating the at least one of closure and opening of the inlet valve and the exhaust valve with the stored value of the crankshaft angle (ivc, ivo, evc) which corresponds to the estimated current value of the operation-related parameter (n, τ). Storing relevant values of the crankshaft angle as a function of at least one operation-related parameter makes it relatively easy to provide a relevant value of crankshaft angle at which the valve adjustment needs to be effected during each cycle of a combustion engine's combustion processes. It is thus possible to provide a control which quickly adapts to prevailing circumstances so that self-ignition of the combustion engine is substantially always achieved when the crankshaft is at a substantially optimum rotational angle.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE INVENTION

Figure 1:
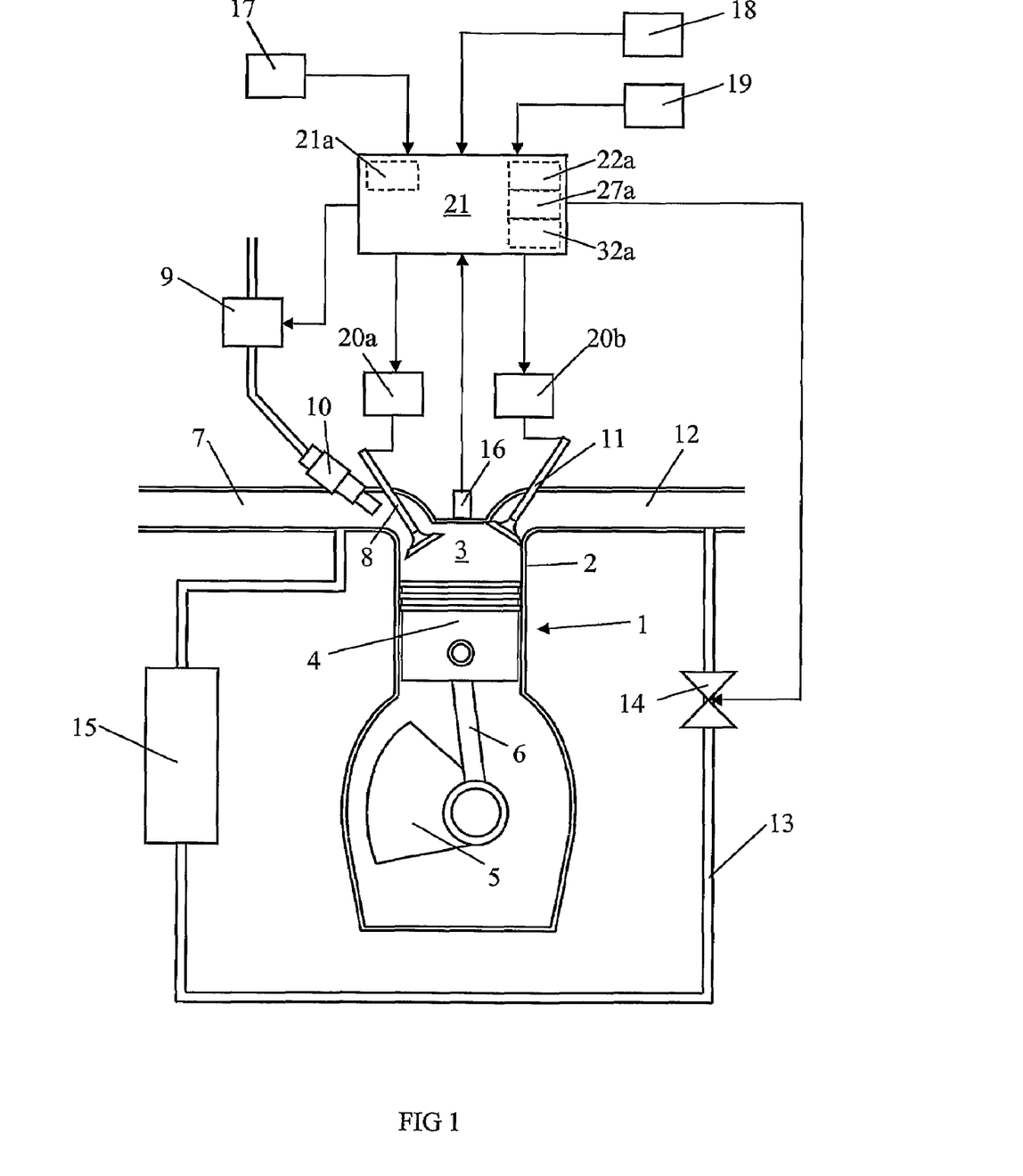
FIG. 1 depicts a combustion engine with an arrangement according to the present invention.

FIG. 1 depicts an arrangement for controlling a four-stroke combustion engine 1 of the type in which a homogeneous mixture of fuel and air is compressed until self-ignition of the mixture is caused by the heat developed during the compression. Such an engine 1 is usually called an HCCI (homogeneous charge compression ignition) engine. An HCCI engine may be regarded as a combination of an Otto engine and a diesel engine. The engine 1 is depicted here with one cylinder 2 but may of course have substantially any desired number of such cylinders 2. The engine 1 comprises a combustion chamber 3 which is bounded downwards in the cylinder 2 by a movable piston 4. The piston is connected to a crankshaft 5 via a connecting rod 6. The motion of the piston 4 in the cylinder 2 converts to rotary motion of the crankshaft 5.

When the piston 4 moves downwards in the cylinder 2 and an inlet valve 8 is open, air is drawn into the expanding combustion chamber 3 via an inlet line 7. At the same time, a fuel pump 9 injects fuel into the combustion chamber 3 via an injection nozzle 10. The inlet valve 8 usually closes at the stage when the piston 4 changes direction at an extreme lower position. The subsequent upward movement of the piston 4 causes compression of the fuel mixture in the combustion chamber 3. The fuel mixture undergoes a temperature increase which is related to the degree of compression. Substantially at the stage when the piston 4 has passed an extreme upper position in the cylinder 2, the fuel mixture should have reached the temperature at which self-ignition of the fuel mixture occurs. During the combustion process, powerful expansion occurs in the combustion chamber 3 and the piston 4 is pushed downwards. When the piston 4 has passed the extreme lower position, an exhaust valve 11 opens. The subsequent upward movement of the piston 4 then pushes the exhaust gases formed during the combustion process out via the exhaust valve 11 to an exhaust line 12.

The arrangement comprises a return line 13 for recirculation of exhaust gases which extends from the exhaust line 12 to the inlet line 7. The return line 13 comprises a valve 14 and a cooler 15. The arrangement also comprises a pressure sensor 16 adapted to detecting the pressure in the combustion chamber 3, and a calculation unit 17 adapted to calculating the temperature in the combustion chamber 3. A sensor 18 is adapted to detecting the rotational position of the crankshaft 5. The sensor 18 may, for example, detect the position of the engine's flywheel. A sensor 19 is adapted to detecting the speed of the combustion engine 1. The arrangement comprises a schematically depicted hydraulic system 20a for controlling the opening and closure of the inlet valve 8, and a schematically depicted hydraulic system 20b for controlling the opening and closure of the exhaust valve 11. In this case the opening and closure of the inlet valve 8 and the exhaust valve 11 can be effected irrespective of the crankshaft's rotational position. The arrangement comprises a control unit 21 adapted to controlling the engine 1 in such a way that self-ignition of the fuel mixture occurs at a substantially optimum crankshaft angle. The control unit 21 is connected to the pressure sensor 16, the calculation unit 17, the sensor 18 and the sensor 19. The control unit 21 is adapted to sending control signals to the hydraulic systems 20a, b so that the opening and closure of the inlet valve 8 and the exhaust valve 11 take place at desired crankshaft angles. The control unit 21 may be a computer unit provided with software stored on a data support 21a.

Figure 2:
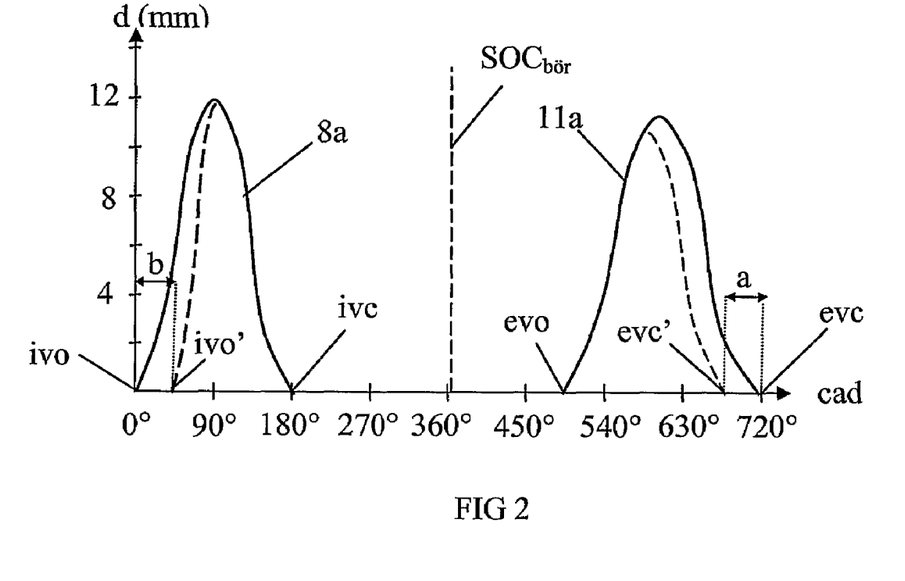
FIG. 2 depicts valve adjustments of a combustion engine according to a first strategy.

FIG. 2 depicts in continuous lines the lifting distance 8a of an inlet valve and the lifting distance 11a of an exhaust valve as a function of the crankshaft angle cad (crank angle degree) in the case of conventional control of the inlet valve 8 and the exhaust valve 11. In this case, inlet valve opening ivo takes place substantially at the extreme upper position of the piston 4 at a crankshaft angle here designated as 0°. Likewise in this case, inlet valve closure ivc takes place just after the piston has passed the extreme lower position at crankshaft angle 180°. Exhaust valve opening evo takes place at a crankshaft angle of about 500° and exhaust valve closure evc takes place substantially at the piston's extreme upper position at crankshaft angle 720°. As the engine 1 is a four-stroke engine, its working cycle comprises crankshaft rotation through 720°. Crankshaft angles 0° and 720° are thus equivalent from the working cycle point of view. Under conventional valve control, exhaust valve closure evc and inlet valve opening ivo take place substantially simultaneously or with a certain overlap to provide assurance that the combustion chamber is emptied of exhaust gases after a combustion process. The optimum crankshaft angle at which self-ignition of the fuel mixture should take place SOCbör (start of combustion) is close to the extreme upper position of the piston 4 at crankshaft angle 360°. The difficulty of supplying a fuel mixture which will self-ignite substantially exactly at the crankshaft angle SOCbör is a contributory cause of HCCI engines having substantially not yet been used conventionally.

A first strategy I for controlling the self-ignition of the fuel mixture to the optimum crankshaft angle $SOC_{bör}$ is to close the exhaust valve 11 before the piston 4 reaches its extreme upper position at 720° and to open the inlet valve 8 after the piston 4 has passed its extreme upper position at 0°. Such valve lifting comprising early exhaust valve closure evc' and late inlet valve opening ivo' is represented by discontinuous lines in FIG. 2. Early exhaust valve closure evc' and late inlet valve opening ivo' result in a so-called negative overlap during a crankshaft angle range in which both the inlet valve 8 and the exhaust valve 11 are closed. In this situation, the exhaust valve 11 is closed during a crankshaft angle range a before 720° and the inlet valve is closed during a crankshaft angle range b after 0°. The resulting negative overlap will be the aggregate of crankshaft angle ranges a and b. Early exhaust valve closure evc' results in the combustion chamber 3 not being entirely emptied of exhaust gases, so that a certain amount of exhaust gases will be retained in the combustion chamber 3. Late opening of the inlet valve 8 means that the pressure of the remaining exhaust gases will be reduced to a level such that they do not flow out through the inlet valve 8 when it opens. The negative overlap thus results in hot exhaust gases from a combustion process being retained in the combustion chamber until a subsequent combustion process. The hot exhaust gases therefore heat the fuel mixture so that it achieves early self-ignition. Suitable control of the inlet valve 8 and the exhaust valve 11 can be applied to cause a variable amount of exhaust gases to be retained in the combustion chamber 3 so that the self-ignition of the next combustion process occurs at substantially the optimum crankshaft angle $SOC_{bör}$.

Figure 3:
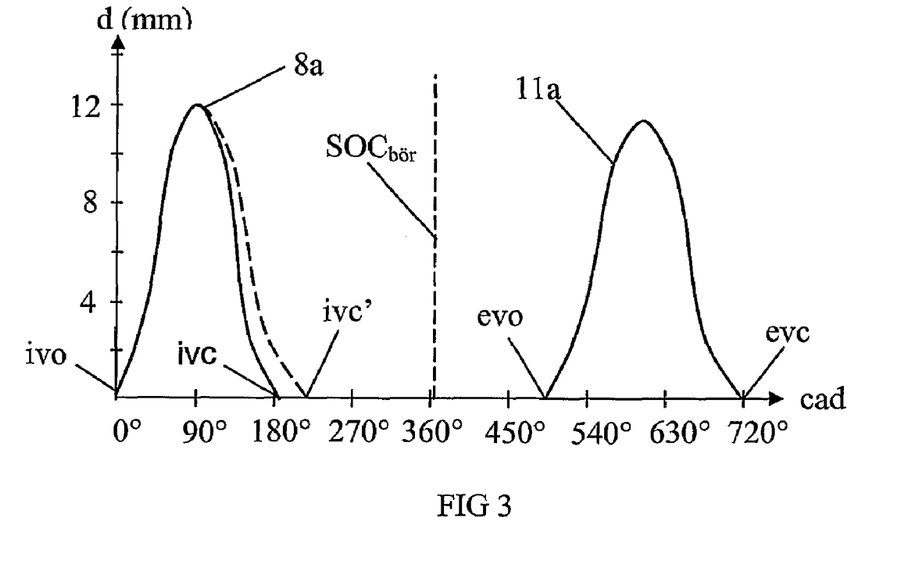
FIG. 3 depicts valve adjustments of a combustion engine according to a second strategy.

A second strategy II for controlling the self-ignition of fuel mixtures for different loads to a substantially optimum crankshaft angle $SOC_{bör}$ is to provide late inlet valve closure ivc'. FIG. 3 depicts in continuous lines the inlet valve's lifting distance 8a and the exhaust valve's lifting distance 11a as a function of the crankshaft's rotational angle cad (crank angle degree) in the case of conventional lifting of the inlet valve 8 and the exhaust valve 11. Valve lifting which results in late inlet valve closure ivc' is represented by discontinuous lines. In other respects the valve lifting according to strategy II takes place in a conventional manner according to the continuous line.

Closing the inlet valve 8 at a late crankshaft angle ivc' reduces the piston movement required for compressing the fuel mixture and results in a reduced effective compression ratio in the cylinder 2.

When the engine 1 has a load which corresponds to an exactly ideal combination of fuel and air, the fuel mixture self-ignites due to compression heat at the optimum crankshaft angle $SOC_{bör}$. In cases where the engine 1 has a lower than ideal load and a leaner than ideal fuel mixture, self-ignition due to compression heat is not possible. In such cases, strategy I can be applied to supply a suitable amount of hot exhaust gases for raising the temperature of the fuel mixture so that self-ignition occurs at the optimum crankshaft angle $SOC_{bör}$. When the engine 1 has a higher than ideal load and a richer than ideal fuel mixture, self-ignition due to compression heat occurs too early. In this case, strategy II can be applied by appropriate reduction of the effective compression ratio in the cylinder 2 to delay self-ignition so that it occurs at the optimum crankshaft angle $SOC_{bör}$. Strategy I and strategy II are thus applicable within separate but mutually adjacent load ranges. Using strategy I for leaner than ideal fuel mixtures and strategy II for richer than ideal fuel mixtures makes it possible to achieve optimum self-ignition within a continuous relatively large load range.

The ignition delay τ, i.e. the time to the start of self-ignition SOC can be predicted by the equation $$\tau = A * P^{-k} * e^{B/T} \quad [1]$$

where A, k, B are positive constants, P is the pressure prevailing in the combustion chamber and T is the temperature prevailing in the combustion chamber.

If the pressure P and the temperature T vary during the ignition delay τ, as is the case during the compression in the cylinder, the ignition delay τ is estimated by the equation $$\int_{t_{IVC}}^{t_{IVC}+t_{SOC}} \frac{1}{\tau(s)} ds = 1 \quad [2]$$

where $t_{IVC}$ is the point in time for closure of the inlet valve and $t_{IVC}+t_{SOC}$ is the point in time when there is a basis for self-ignition of the fuel mixture.

The integral in equation [2] only increases significantly during the latter part of the compression of the fuel mixture in the combustion chamber 3. The ignition delay τ predicted by equation [1] based on the pressure P and the temperature T in the combustion chamber at a crankshaft angle relatively close to the extreme upper position at 360° is therefore closely related to the ignition delay τ according to equation [2]. The option adopted in this situation is therefore to measure the pressure P and calculate the temperature T in the combustion chamber 3 at a predetermined crankshaft angle of 350°, i.e. 10° before the extreme upper position. The result is a predetermined crankshaft angle which is sufficiently close to the extreme upper position while at the same time being clearly before the start of the combustion process SOC.

To be able to calculate the ignition delay τ, the assumption is made that parameters such as the combustion engine's inlet pressure, exhaust pressure, inlet temperature, combustion time and lambda λ are constant. In contrast, the adjustment of the valves 8, 11 and the engine speed n are regarded as variable parameters. It is therefore possible to use information about the pressure P at the predetermined crankshaft angle to set up a card which shows the pressure P in the combustion chamber as a function of the crankshaft angles for valve adjustments and the engine speed n. It is also possible to set up a corresponding second card which shows the temperature T in the combustion chamber as a function of the crankshaft angles for valve adjustments and the engine speed n. By means of these two cards it is possible to use equation [1] to calculate the ignition delay τ as a function of the crankshaft angles for valve adjustments and the engine speed n. In this case the rotational angle is thus determined as 350°, i.e. 10° before the extreme upper position. The ignition delay is here designated as $\tau_{t010}$ and is expressed in time. The values of the ignition delay $\tau_{t010}$ are stored in a $\tau_{t010}$ card in which crankshaft angles for valve adjustments and engine speed n also constitute independent variables. The ignition delay $\tau_{t010}$ can be converted from time to crankshaft angles. The ignition delay expressed in crankshaft angles is denoted here by $\tau_{c010}$ and can in a corresponding manner be stored in a $\tau_{c010}$ card.

Figure 4:
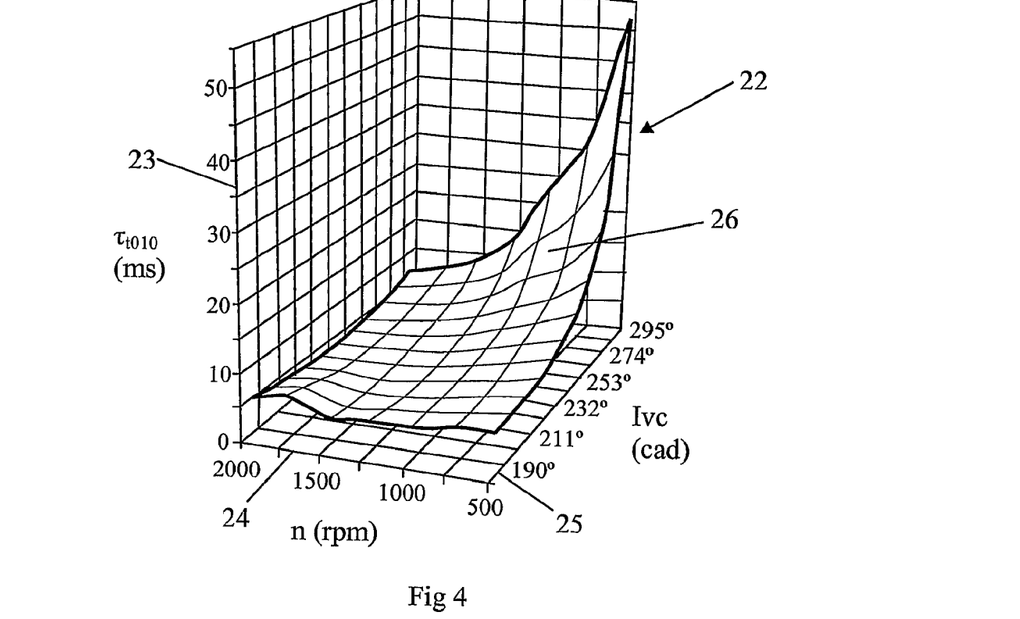
FIG. 4 depicts a first card for determining the crankshaft angle for closure of the inlet valve.

FIG. 4 depicts an example of a $\tau_{t010}$ card 22 which comprises a three-dimensional coordinate system. The $\tau_{t010}$ card has a first axis 23 denoting the ignition delay $\tau_{t010}$ in milliseconds, a second axis 24 denoting the engine speed n and a third axis 25 denoting crankshaft angles for closure of the inlet valve ivc. The $\tau_{t010}$ card 22 comprises a surface 26 which represents the relationship between said parameters. The $\tau_{t010}$ card 22 is adapted to making it possible to control combustion engine 1 according to strategy II. It should be noted that the surface 26 has a parabola-like shape. The bottom portion of the parabola-like surface 26 defines ivc values at a transition from strategy II to strategy I. The $\tau_{t010}$ card 22 is stored in a memory unit 22a in the control unit 21.

Figure 5:
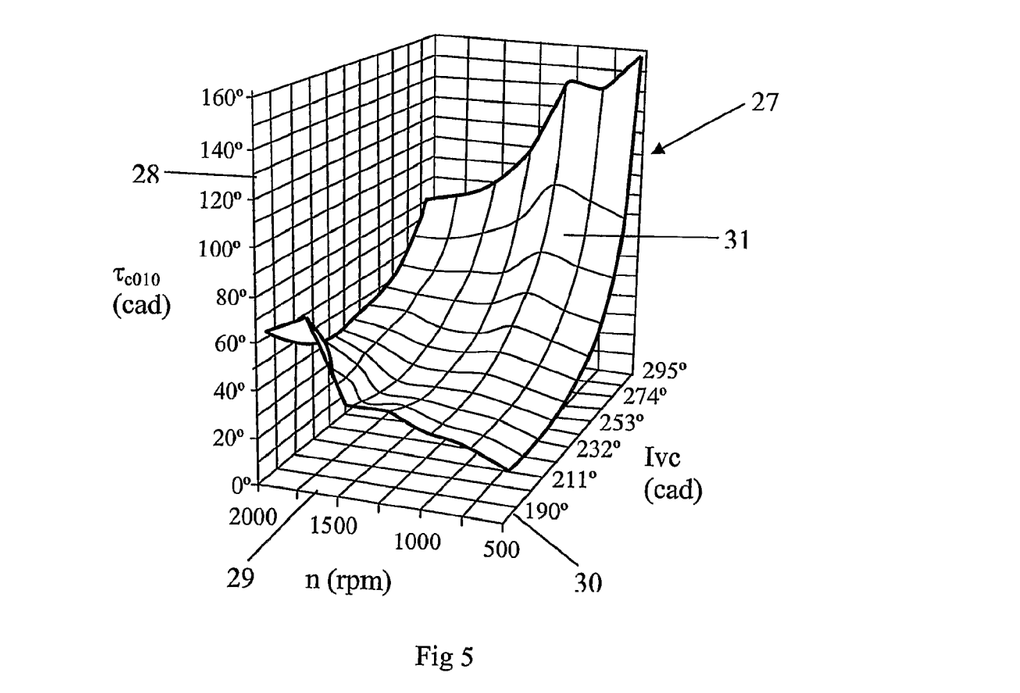
FIG. 5 depicts a second card for determining the crankshaft angle for closure of the inlet valve.

FIG. 5 depicts an example of a $\tau_{c010}$ card 27 which comprises a three-dimensional coordinate system with a first axis 28 denoting the ignition delay $\tau_{c010}$ in milliseconds, a second axis 29 denoting the engine speed n and a third axis 30 denoting crankshaft angles for closure of the inlet valve ivc. The $\tau_{c010}$ card 27 comprises a surface 31 which represents the relationship between said parameters. The $\tau_{c010}$ card 27 is adapted to determining the inlet valve closure ivc according to strategy II. The $\tau_{c010}$ card 27 is stored in a memory unit 27a in the control unit 21.

Figure 6:
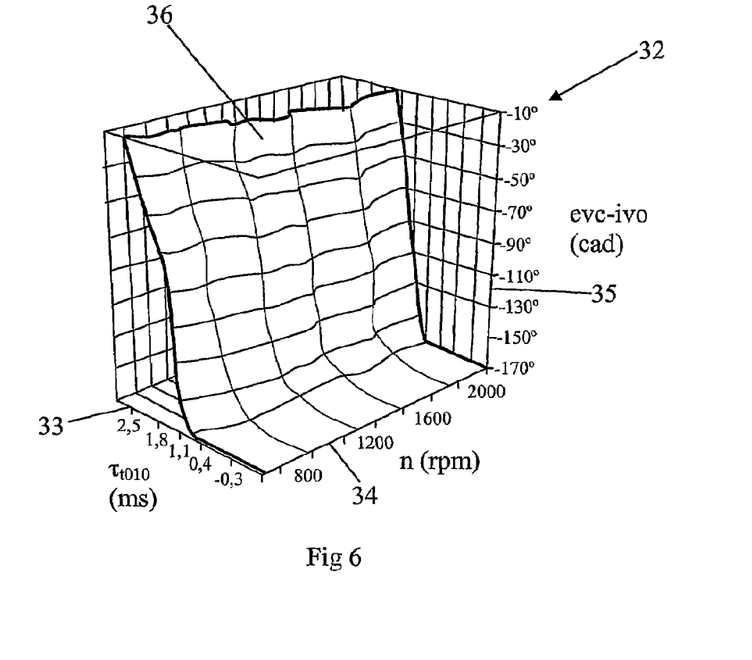
FIG. 6 depicts a third card for determining the negative overlap between the exhaust valve and the inlet valve.

FIG. 6 depicts an example of a $\tau_{t010}$ card 32. The $\tau_{t010}$ card 32 comprises a three-dimensional coordinate system with a first axis 33 denoting the ignition delay $\tau_{t010}$ in milliseconds, a second axis 34 denoting the engine speed n and a third axis 35 denoting values of the negative overlap, i.e. the difference between the closure of the exhaust valve evc and the opening of the inlet valve ivo. The $\tau_{t010}$ card comprises a surface 36 which represents the relationship between said parameters. The $\tau_{t010}$ card is adapted to providing control of the HCCI engine 1 according to strategy I. A corresponding card may of course also express the ignition delay τ in crankshaft angles and be designated as a $\tau_{c010}$ card in which the third axis denotes values of the negative overlap. The $r\tau_{t010}$ card 32 is stored in a memory unit 32a in the control unit 21.

Figure 7:
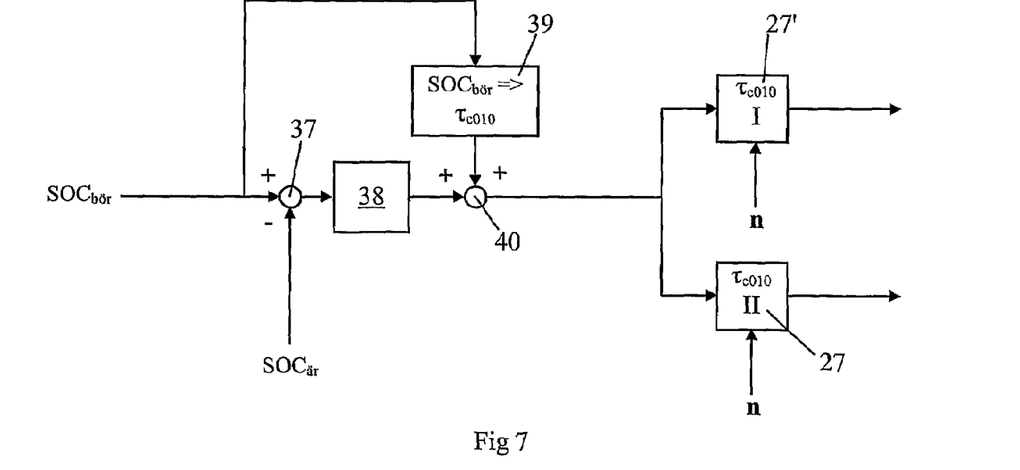
FIG. 7 depicts a first embodiment of a control circuit of the arrangement for adjusting the exhaust valve and the inlet valve at optimum crankshaft angles.

FIG. 7 depicts a control circuit of the arrangement for controlling the combustion engine 1. During operation of the combustion engine 1, the control unit 21 receives information from the pressure sensor 16 concerning the pressure P in the combustion chamber 3. As the pressure P in the combustion chamber increases upon self-ignition of the fuel, it is possible for the control unit 21 to estimate the start of the actual combustion process $SOC_{är}$. A signal representing the estimated start for the combustion process $SOC_{är}$ and a signal representing the desired start for the combustion process $SOC_{bör}$ are received in a first summating unit 37 whereby the difference between $SOC_{är}$ and $SOC_{bör}$ is determined. A signal from the first summating unit 37 representing said difference is led to a PI regulator 38 for further processing. The arrangement also comprises a calculation unit 39 which recalculates $SOC_{bör}$ so that the latter is expressed as a corresponding $\tau_{c010}$ value. This $\tau_{c010}$ value is thereafter corrected in a second summating unit 40 which adds to it a control-error-based adjustment from the PI regulator 38. The second summating unit 40 thereupon emits a signal representing a corrected $\tau_{c010}$ value to two $\tau_{c010}$ cards 27, 27' which are used for the different strategies I, II. Information about the ignition delay $\tau_{c010}$ and the engine speed n can be used to determine the valve adjustments in the respective $\tau_{c010}$ cards 27, 27'. If a sufficiently low $\tau_{c010}$ value is received, $\tau_{c010}$ card 27' provides the value for the necessary negative overlap according to strategy I, while $\tau_{c010}$ card 27 provides conventional closure of the inlet valve ivc. If instead a sufficiently high $\tau_{c010}$ value is received, $\tau_{c010}$ card 27 provides a necessary closure value of the inlet valve ivc according to strategy II, while $\tau_{c010}$ card 27' provides conventional closure of the exhaust valve evc and opening of the inlet valve ivo.

Figure 8:
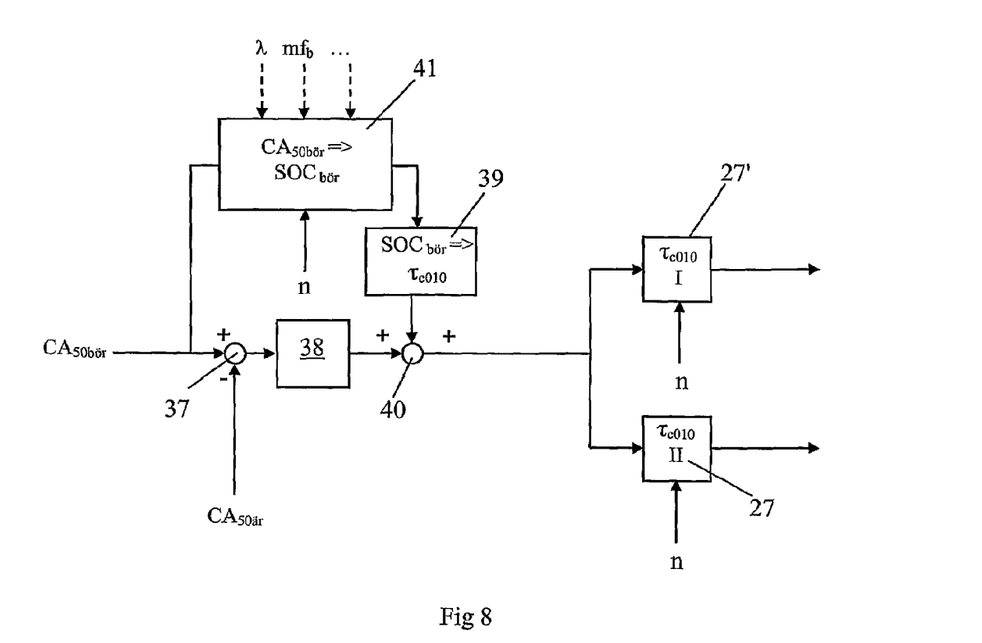
FIG. 8 depicts a second embodiment of a control circuit of the arrangement for adjusting the exhaust valve and the inlet valve at optimum crankshaft angles and FIG. 9 depicts a third embodiment of a control circuit of the arrangement for adjusting the exhaust valve and the inlet valve at optimum crankshaft angles.

FIG. 8 depicts an alternative control circuit of the arrangement for controlling an HCCI engine. During operation of the combustion engine 1, the control unit 21 receives information from the pressure sensor 16 concerning the pressure P in the combustion chamber 3. It is often difficult, however, to directly detect the start of the combustion process $SOC_{är}$ with sufficiently good precision. It is usually easier to determine with good precision on the basis of the pressure P the crankshaft angle at which, for example, half of the fuel mixture has been consumed. This crankshaft angle is here designated $CA_{50}$. In this case the first summating unit 37 receives a signal representing the rotational angle of the crankshaft, $CA_{50bör}$, when half of the amount of fuel should have been consumed, and a signal representing when half of the amount of fuel had been consumed, $CA_{50är}$, during the latest combustion process. The first summating unit 37 determines the difference between $CA_{50är}$ and $CA_{50bör}$. A signal representing said difference is led to the PI regulator 38. In this case the arrangement has a further calculation unit 41 adapted to converting $CA_{50bör}$ to an $SOC_{bör}$ value. Knowledge of parameters such as lambda λ and the proportion of fuel burnt $mf_b$ (mass fraction burnt) can be used to determine the duration of combustion and hence calculate the actual start of the combustion process $SOC_{är}$. The calculated value of $SOC_{bör}$ is thereafter converted in a calculation unit 39 to a corresponding $\tau_{c010}$ value. This $\tau_{c010}$ value is corrected by the control-error-based adjustment signal from the PI regulator 38 in the second summating unit 40. The second summating unit 40 thereupon emits a signal representing a corrected $\tau_{c010}$ value to two corresponding $\tau_{c010}$ cards 27, 27' which are used in FIG. 7.

Figure 9:
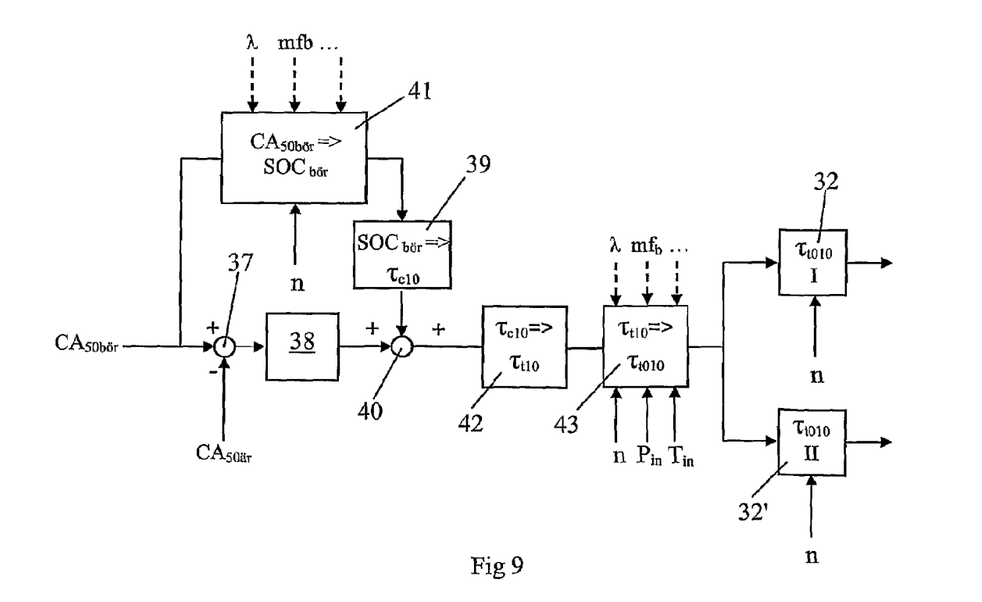

FIG. 9 depicts a further alternative embodiment of a control circuit of an arrangement for controlling the HCCI engine. In this case the first summating unit 37 receives a signal representing when half of the amount of fuel should have been consumed, $CA_{50bör}$, and a signal representing when half of the amount of fuel had been consumed, $CA_{50är}$, during the latest combustion process. The first summating unit 37 determines the difference between $CA_{50är}$ and $CA_{50bör}$. A signal representing said difference is led to the PI regulator 38. The calculation unit 41 converts $CA_{bör}$ to an $SOC_{bör}$ value on the basis inter alia of information about the parameters λ and $mf_b$. The calculated value of $SOC_{bör}$ is thereafter converted in the calculation unit 39 to a corresponding $\tau_{c10}$ value. This $\tau_{c10}$ value is corrected by the control-error-based adjustment signal from the PI regulator 38 in the second summating unit 40. The second summating unit 40 thereupon emits a signal representing a corrected $\tau_{c10}$ value. This corrected $\tau_{c10}$ value is converted in a calculation unit 42 to a $\tau_{t10}$ value whereby the ignition delay τ is expressed in time instead of in rotational angles.

The cards 22, 27, 32 depicted in FIGS. 4, 5 and 6 are based on simulations with constant values of parameters representing inlet pressure, outlet pressure, inlet temperature, combustion time and lambda λ. Cards are therefore only usable for determining valve adjustments with great accuracy when the abovementioned parameters are substantially constant. It is possible, however, to compensate the input values so that the cards become generally usable, whereby the aforesaid parameters of inlet pressure, outlet pressure, inlet temperature, combustion time and lambda λ may assume varying values. This case involves, however, a more advanced calculation operation. Such a calculation operation is performed in a calculation unit 43. The calculation unit 43 thereupon emits a signal denoting a compensated calculated $\tau_{t010}$ value to two $\tau_{t010}$ cards 32, 32'. Information about the ignition delay $\tau_{t010}$ and the engine speed n can be used to determine the valve adjustments in the respective $\tau_{t010}$ cards 32, 32'. $\tau_{t010}$ card 32 can be used to determine necessary values for the negative overlap according to strategy I and $\tau_{t010}$ card 32' can be used to determine a closure value of the inlet valve ivc according to strategy II.

All the process steps, as also any desired part-sequences of steps, described above can of course be controlled by a computer programme which is directly loadable to the internal memory of a computer and comprises suitable software for controlling the necessary steps when the programme is run on the computer. Moreover, even if the embodiments of the invention described with reference to the drawings are software-controlled by means of a computer and processes executed by a computer, the invention also extends to computer programmes, particularly such computer programmes stored on a data support adapted to implementing the invention. The programme may be in the form of source code, object code or a code constituting a level between source and object code, e.g. in partly compiled form or in any other desired form suitable for use in implementing the method according to the invention. The data support may be any desired entity or device capable of storing the programme. For example, the data support may comprise a storage medium such as ROM (read only memory), PROM (programmable read-only memory), EPROM (erasable PROM), Flash or EEPROM (electrically EPROM). Moreover, the data support may take the form of a transferable support such as an electrical or optical signal which can be transmitted via an electrical or optical cable or by radio or in some other way. When the programme is comprised in a signal which can be led directly through a cable or other device or means, the data support may take the form of such a cable, device or equipment. Alternatively, the data support may be an integrated circuit in which the programme is stored, whereby the integrated circuit is adapted to executing, or being used in the execution of, relevant processes.

The invention is in no way limited to the embodiments illustrated in the drawing but may be varied freely within the scopes of the claims. The combustion engine need not be an HCCI engine but may be any desired combustion engine in which a homogeneous fuel mixture self-ignites during compression. The drawing depicts a combustion engine 1 with one cylinder, but the number of cylinders may of course be varied, as also the number of components involved such as valves, injection means etc.

The invention claimed is:

1. An arrangement for controlling a combustion engine, wherein the combustion engine comprises a combustion chamber, a movable piston for compressing a fuel mixture in the combustion chamber so as to cause self-ignition of the fuel mixture, a crankshaft driven by movement of the piston, at least one inlet valve of the combustion chamber and at least one exhaust valve of the combustion chamber, wherein the arrangement comprises:
   a control unit operable for initiating at least one of a closure and an opening of the at least one inlet valve and the at least one exhaust valve at a current crankshaft angle as a function of at least one operation-related parameter such that the self-ignition of the fuel mixture occurs when the crankshaft is at a target crankshaft angle;
   a storage device operable to store a relevant value of the current crankshaft angle only for when the crankshaft is at a predetermined rotational angle;
   a parameter-estimator operable for estimating values of the at least one operation-related parameter during operation of the combustion engine; and
   the control unit is operable to initiate the at least one of the closure and the opening of the at least one inlet valve and the at least one exhaust valve according to the stored value of the current crankshaft angle.

2. The arrangement according to claim 1, wherein the predetermined rotational angle of the crankshaft is within a range of 8° to 12° before the crankshaft reaches a rotational position corresponding to a top dead center position of the piston at which the self-ignition of the fuel mixture occurs.

3. The arrangement according to claim 1, wherein the parameter-estimator comprises a sensor operable to detect a speed of the combustion engine as the at least one operation-related parameter.

4. The arrangement according to claim 3, wherein the parameter-estimator comprises at least one unit operable to estimate an ignition delay as the operation-related parameter, wherein the ignition delay is the time to self-ignition from when the crankshaft is at the predetermined rotational angle.

5. The arrangement according to claim 4, further comprising a sensor operable to detect a current pressure, and a calculation unit operable to calculate a current temperature in the combustion chamber when the crankshaft is at the predetermined rotational angle.

6. The arrangement according to claim 1, further comprising a detector operable to detect when the self-ignition of the fuel mixture starts.

7. The arrangement according to claim 6, further comprising a feedback device operable to compare an actual crankshaft angle for self-ignition with the target value for self-ignition, whereby the control unit is operable to control the self-ignition of a next combustion process based on the comparison.

8. The arrangement according to claim 1, wherein the control unit is operable to initiate, in a first load range, closure of the at least one exhaust valve at a first crankshaft angle and opening of the at least one inlet valve at a second crankshaft angle such that supplying or retaining of a variable amount of hot exhaust gases in the combustion chamber is achieved so that the self-ignition of the next combustion process occurs at the target crankshaft angle.

9. The arrangement according to claim 8, wherein the control unit is operable to initiate, in a second load range, closure of the at least one inlet valve at a third crankshaft angle enabling varying an effective compression ratio in the combustion chamber so that the self-ignition of the next combustion process occurs at the target crankshaft angle.

10. A method for controlling a combustion engine, wherein the combustion engine comprises a combustion chamber, a movable piston operable to compress a fuel mixture in the combustion chamber so as to cause self-ignition of the fuel mixture, a crankshaft driven by movement of the piston, at least one inlet valve of the combustion chamber and at least one exhaust valve of the combustion chamber, wherein the method comprises the steps of;
  initiating at least one of a closure and an opening of the at least one inlet valve and the at least one exhaust valve at a current crankshaft angle as a function of at least one operation-related parameter such that the self-ignition of the fuel mixture occurs when the crankshaft is at a target crankshaft angle;
  storing a value of the current crankshaft angle only for when the crankshaft is at a predetermined rotational angle;
  estimating values of the at least one operation-related parameter during operation of the combustion engine; and
  initiating the at least one of the closure and the opening of the at least one inlet valve and the at least one exhaust valve according to the stored value of the current crankshaft angle.

11. The method according to claim 10, wherein the predetermined rotational angle of the crankshaft is within a range of 8° to 12° before the crankshaft reaches a rotational position corresponding to a top dead center position of the piston when the self-ignition of the fuel mixture occurs.

12. The method according to claim 10, the estimating comprising detecting a speed of the combustion engine as the at least one operation-related parameter.

13. The method according to claim 10, the estimating comprising estimating an ignition delay as the at least one operation-related parameter, wherein the ignition delay is a time to self-ignition from when the crankshaft is at the predetermined rotational angle.

14. The method according to claim 13, further comprising detecting a current pressure and calculating a current temperature in the combustion chamber when the crankshaft is at the predetermined rotational angle.

15. The method according to claim 10, further comprising detecting when the self-ignition of the fuel mixture starts.

16. The method according to claim 15, further comprising comparing an actual crankshaft angle for self-ignition with the target crankshaft angle and controlling the self-ignition of a next combustion process based on the comparison.

17. The method according to claim 10, further comprising initiating, in a first load range, the closure of the at least one exhaust valve at a first crankshaft angle and the opening of the at least one inlet valve at a second crankshaft angle such that supplying or retaining of a variable amount of hot exhaust gases in the combustion chamber is achieved so that the self-ignition of the next combustion process occurs at the target crankshaft angle.

18. The method according to claim 17, further comprising initiating, in a second load range, the closure of the at least one inlet valve at a third crankshaft angle to enable varying an effective compression ratio in the combustion chamber so that the self-ignition of the next combustion process occurs at the target crankshaft angle.

19. A computer program product for controlling operation of a combustion engine, wherein the combustion engine comprises a combustion chamber, a movable piston operable to compress a fuel mixture in the combustion chamber so as to cause self-ignition of the fuel mixture, a crankshaft driven by movement of the piston, at least one inlet valve of the combustion chamber and at least one exhaust valve of the combustion chamber, the computer program product comprising a computer readable medium comprising computer program code operable when run on a computer to control the combustion engine to perform the method according to claim 10.

* * * * *